(12) United States Patent
El-Bokle

(10) Patent No.: US 11,744,680 B2
(45) Date of Patent: Sep. 5, 2023

(54) DALMAN ORTHODONTIC BRACKET

(71) Applicant: Dalia El-Bokle, Giza (EG)

(72) Inventor: Dalia El-Bokle, Giza (EG)

(*) Notice: Subject to any disclaimer, the term of this patent is extended or adjusted under 35 U.S.C. 154(b) by 0 days.

(21) Appl. No.: 17/155,006

(22) Filed: Jan. 21, 2021

(65) Prior Publication Data

US 2021/0137647 A1    May 13, 2021

Related U.S. Application Data

(63) Continuation of application No. 16/136,240, filed on Sep. 19, 2018, now abandoned.

(51) Int. Cl.

| | |
|---|---|
| *A61C 7/28* | (2006.01) |
| *A61C 7/02* | (2006.01) |
| *A61C 7/14* | (2006.01) |
| *A61C 7/22* | (2006.01) |
| *A61C 7/12* | (2006.01) |
| *A44C 15/00* | (2006.01) |

(52) U.S. Cl.
CPC .............. *A61C 7/287* (2013.01); *A61C 7/143* (2013.01); *A61C 7/146* (2013.01); *A61C 7/22* (2013.01); *A44C 15/007* (2013.01); *A61C 7/02* (2013.01); *A61C 7/125* (2013.01)

(58) Field of Classification Search
CPC ................................ A61C 7/287; A61C 7/125
See application file for complete search history.

(56) References Cited

U.S. PATENT DOCUMENTS

| | | | | |
|---|---|---|---|---|
| 5,873,715 | A * | 2/1999 | Liou ........................ | A61C 7/00 433/7 |
| 2002/0110776 | A1* | 8/2002 | Abels ..................... | A61C 7/285 433/10 |
| 2005/0255422 | A1* | 11/2005 | Cordato ................. | A61C 7/287 433/10 |
| 2006/0172248 | A1* | 8/2006 | Sernetz .................. | A61C 7/282 433/8 |

FOREIGN PATENT DOCUMENTS

| | | | | |
|---|---|---|---|---|
| CN | 205586096 U | * | 9/2016 | ............... A61C 7/12 |
| JP | 2008061805 A | * | 3/2008 | ............. A61C 7/287 |
| WO | WO-2010000883 A1 | * | 1/2010 | ............... A61C 7/12 |

* cited by examiner

*Primary Examiner* — Heidi M Eide
(74) *Attorney, Agent, or Firm* — Innovent Law P.C.; Karima Gulick

(57) ABSTRACT

An orthodontic bracket assembly treatment system comprising a bracket base and at least two rigid selectable bracket covers slidably engageable with the bracket base wherein the selectable at least two rigid selectable bracket covers are removably slidably couplable to said bracket base by slidably engaging the upper lip with the upper retention element and the lower lip with the lower retention element and wherein the width of the face of a first one of the at least two rigid selectable bracket covers is wider than the width of the face of a second one of the at least two rigid bracket covers and can be selectively releasably attached to the base during a treatment such that the treatment utilizes either the first bracket cover or the second bracket cover depending on a patient's treatment needs at a stage of the treatment.

15 Claims, 29 Drawing Sheets

DALMAN ORTHODONTIC BRACKET

CROSS REFERENCE TO RELATED APPLICATIONS

This application claims priority to, and is a Continuation of, U.S. patent application Ser. No. 16/136,240, filed Sep. 19, 2018, now pending, which claims priority to the U.S. Provisional Patent application Ser. No. 62/617,932, filed Jan. 16, 2018 and claims benefit of Turkish Patent Application. No. 2017/13873 filed Sep. 19, 2017, entitled A VERSATILE-USE ORTHODONTIC BRACKET ASSEMBLY.

The entire contents of Turkish Patent application No. 2017/13873, and U.S. Provisional Application No. 62/617,932 are each hereby incorporated by reference.

Although incorporated by reference in its entirety, no arguments or disclaimers made in the parent application apply to this continuation application. Any disclaimer that may have occurred during the prosecution of the above-referenced application is hereby expressly rescinded.

BACKGROUND OF THE INVENTION

1. Field of the Invention

The present invention relates generally to an orthodontic treatment of dental malocclusions using fixed appliances; and more particularly to an orthodontic bracket assembly that allows for a customized orthodontic treatment using removable and customizable bracket cover which can be changed from tooth to tooth and throughout an orthodontic treatment without having to change a bracket base attached to a patient's tooth.

2. Description of the Related Art and Summary of the Invention

Orthodontic brackets are used by dentists to control the position of the teeth in three dimensional planes in conjunction with an orthodontic archwire. They are used to treat dental malocclusions, teeth misalignment and to improve both dental function and esthetics, and to correct various other flaws relating to the teeth and jaws. Traditionally, braces include a set of orthodontic brackets, each bracket is attached to an individual's tooth with an adhesive or other bonding material. Once the brackets are adhered to the teeth and in a given position, an archwire is inserted through a slot formed on each of the brackets. An archwire is a resilient, curved piece of wire that may be bent and/or twisted prior to installation in the bracket slot. Engagement between the archwire and the brackets creates corrective or prescriptive forces which in turn moves the teeth into a desired position, alignment and orientation.

In industry today, the archwire is secured in the archwire slot of an orthodontic bracket by a variety of mechanisms, such as a steel ligature wire, elastomeric o-ring, or elastic ligatures. These are placed around the tie wings to hold the archwire in place within the bracket slot. These are placed around the bracket to hold the archwire in place within the bracket slot and to retain the archwire in position and ensure that the archwire does not disengage from the bracket and archwire slot.

In more recent designs, self-ligating braces use door mechanism, instead of an elastic ligature, to secure the archwire within the bracket slot. These self-ligating brackets include a clamp, gate, or other self-locking mechanism, such as a closeable bracket slot, that allows the self-ligating bracket to retain the archwire in the archwire slot without requiring the use of other ligatures or other separate fasteners. Steel or elastomeric ligatures that are used to secure arch wires in the bracket slots have many disadvantages. They create friction during dental alignment and sliding of the teeth. High forces are then required to overcome these frictional forces in order to effect tooth movement. This can be detrimental to the teeth & supporting periodontium as it is associated with increased risk of root resorption, longer treatment time due to undermining resorption and increased patient discomfort.

Ligatures are also unhygienic as they trap food debris and are difficult to clean. Elastic ligatures also tend to lose their elasticity over time and therefore gradual loss of tip and rotational control occurs during tooth movement. This results in the need for dental realignment and hence extended treatment time. Passive self-ligating brackets have a self-ligating mechanism that allows for avoidance of use of the above-mentioned ligatures and have been preferred by many clinicians due to the claims of reduced force, better hygiene and reduced treatment time. However, these are expensive, time consuming to change when a single bracket breaks, and the self-locking mechanism can break, become stiff or fail. Failures of the ligating slide results in having to remove the base member from the patient's tooth and attach a new bracket to the tooth to continue treatment. This is a costly and time-consuming process for both the clinician and the patient.

The present disclosure aims to overcome challenges and problems of the prior art. In one aspect of the present disclosure, an orthodontic bracket assembly includes a bracket base and a customizable bracket cover. The orthodontic bracket covers are made of various widths, inner wall angles, adjustable faces and optional inner projection to exert various forces and pressures on an archwire for a customizable orthodontic treatment.

Bracket cover width affects an archwire flexibility which is desirable during the initial stages of orthodontic treatment. Narrow bracket covers increase the span between bracket bases and bracket covers, which results in increased archwire flexibility. The resultant lower force level culminates in less patient discomfort, fast & biologic tooth movement. On the other hand, narrow bracket covers result in reduced rotational control, making finishing orthodontic cases and closure of spaces by sliding more difficult. Hence the need of a customizable orthodontic treatment.

In industry today, there are no option regarding the adjustability of bracket width to suit different stages of orthodontic treatment. Treatment of a patient's teeth using braces to correct dental issues typically requires several appointments to monitor progress and adjust the braces as treatment progresses. Accordingly, the present inventors have identified a need for an improved system that streamlines the treatment process to reduce the length of treatment by more efficiently aligning a patient's teeth. Additional aspects and advantages will be apparent from the following detailed description of preferred embodiments, which proceeds with reference to the accompanying drawings.

DETAILED DESCRIPTION OF THE INVENTION

Figure 12:
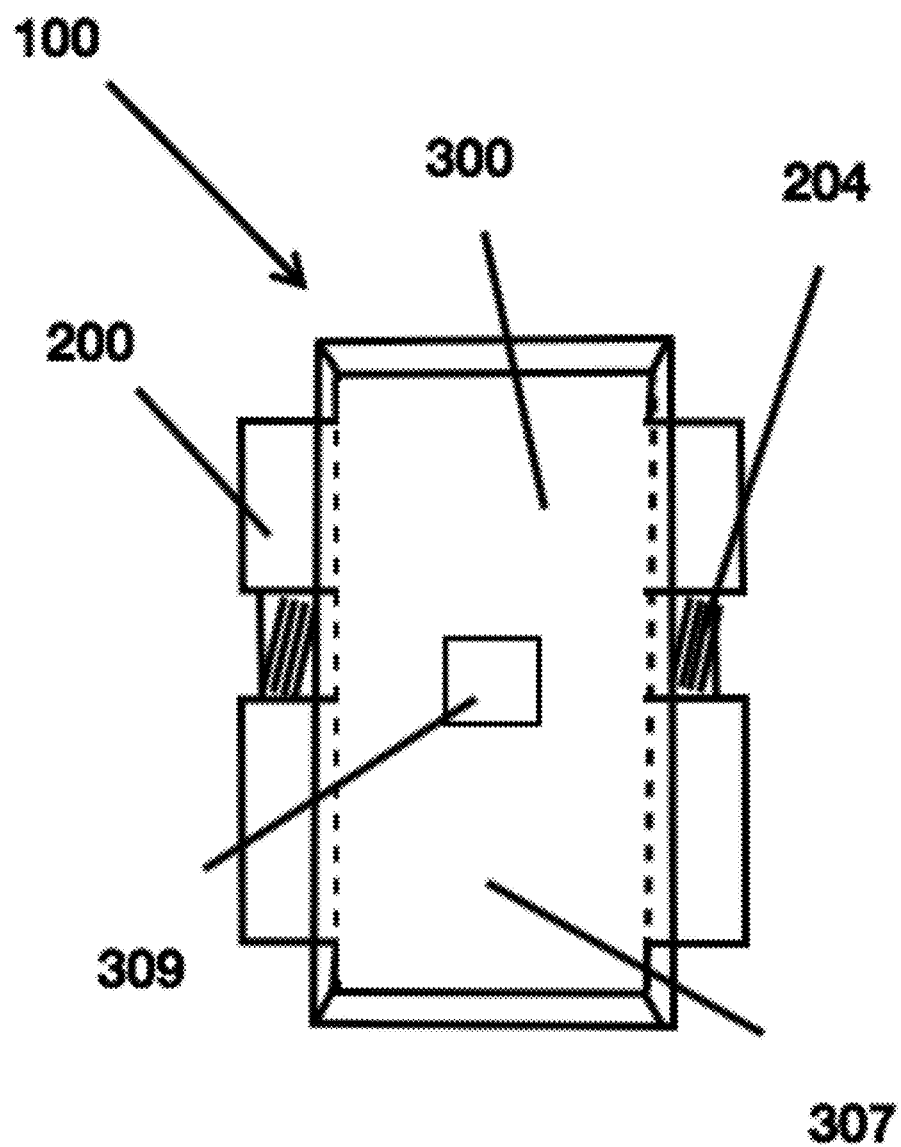
FIG. 12 is a front view of an orthodontic bracket assembly showing a bracket base and a bracket cover coupled to one another and an archwire secured to the bracket base.

Referring now to the drawings and the characters of reference marked thereon, FIG. 12 shows a simplified diagram illustrating an embodiment of the disclosed orthodontic bracket assembly 100, including a bracket base 200 and a customizable bracket cover 300.

FIGS. 1 through 5 show various embodiments of the bracket base 200 including a mounting portion 201 for attachment to a patient's tooth. The bracket base also includes an upper retention element 202 and a lower retention element 203. In some embodiments, the upper and lower retention elements are in the form of a wing or a lip. The upper and lower said lower retention elements 202 and 203 form a slot 204 where an archwire can be secured.

FIGS. 6 through 11 show various embodiments of a customizable bracket cover 300. The bracket cover 300 has a width 301, an upper lip 302 and a lower lip 303. In some embodiments, the upper and lower lip 302 and 303 of the customizable bracket cover 300 can be coupled or attached to the bracket base 200. In a preferred embodiment, the bracket cover lips slide onto a bracket base retention elements, and the bracket covers secures an archwire 211 onto the bracket base.

In some embodiments the customizable bracket cover 300 is removably couplable the bracket base 200. The bracket cover can be easily attached or removed from the bracket base. In order to ensure that the archwire is secured between the bracket base and the bracket cover, without causing friction, the orthodontic bracket assembly 100 includes a locking mechanism to restrict axial movement of the customizable bracket cover 300 to the bracket base 200. This locking mechanism can be the sliding of the bracket cover onto the bracket base thanks to the complementary bracket cover lips and bracket base retention elements or can be an additional locking mechanism such as sets of complementary notches 209 on a bracket base and projections 210 on the bracket base. The notches can be either on the bracket base or the bracket cover, and the complementary projections can be on the bracket base or the bracket cover as well, so long as they are complementary, and so long as either a notch or projection in on the bracket cover and the complementary projection or notch is on the bracket base.

This locking mechanism can be mechanic, fluid or magnetic, so long as the customizable bracket cover locks into the bracket cover thereby securing an archwire to the orthodontic bracket assembly, and so long as movement of the customizable bracket cover on the bracket base is restricted. In some embodiments, the customizable bracket cover upper and lower lips slide or snap and lock into the bracket base upper and lower retention elements. This locking of the bracket base on the bracket cover is used to ensure that there is no friction on the assembly while securing the archwire 211 onto the bracket base 200.

In other embodiments, the orthodontic bracket assembly 100 is secured, that is, the bracket cover is secured onto the bracket base and the archwire is also secured in the assembly through either a mechanical or magnetic locking mechanism.

In some embodiments as shown in FIGS. 10, 15, 16, 18 through 21, and 27 through 29, the orthodontic bracket assembly also includes hooks 305 and removable hooks 207. The hook can either be a fixed hook 205 onto one side of the orthodontic bracket assembly and either fixed on the bracket base 200 or the bracket cover 300, or a removable hook 207 which can inserted into the secondary archwire slot 205 of the assembly.

Figure 27:
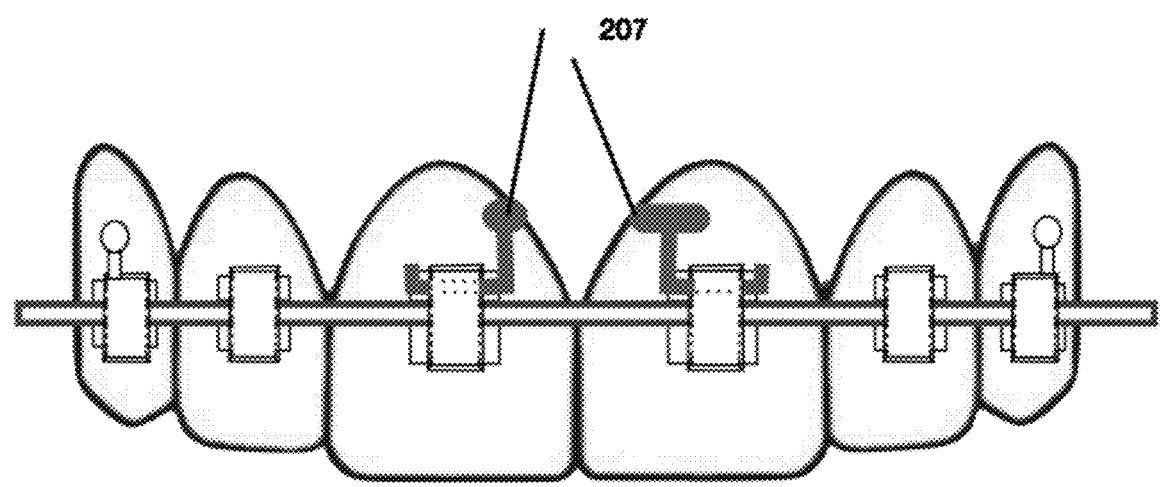
FIG. 27 is an illustration of a row of teeth with an orthodontic bracket assembly, an archwire, fixed hooks and removable hooks.

As illustrated in FIG. 27, the removable hook 207 can be inserted to a secondary slot 205. In some embodiments, the removable hook, either ball hook or T-hook includes an extension arm which can be twisted onto the assembly to ensure that the hook is safely secured onto the assembly, as shown in FIG. 27.

Figure 14:
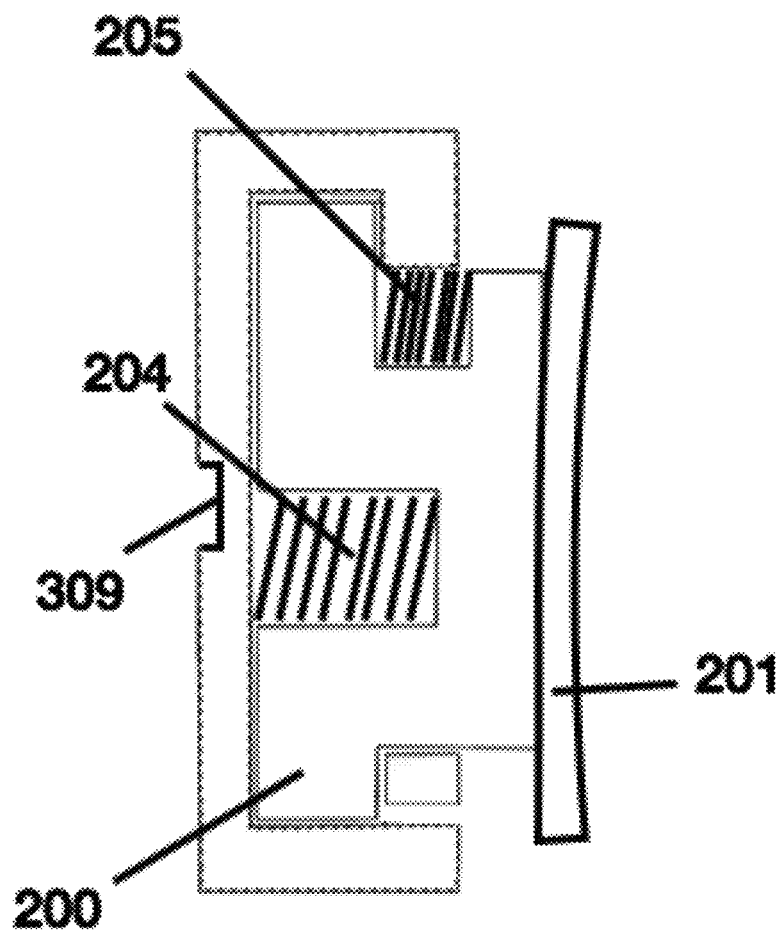
FIG. 14 is a side view of another embodiment of an orthodontic bracket assembly.
Figure 15:
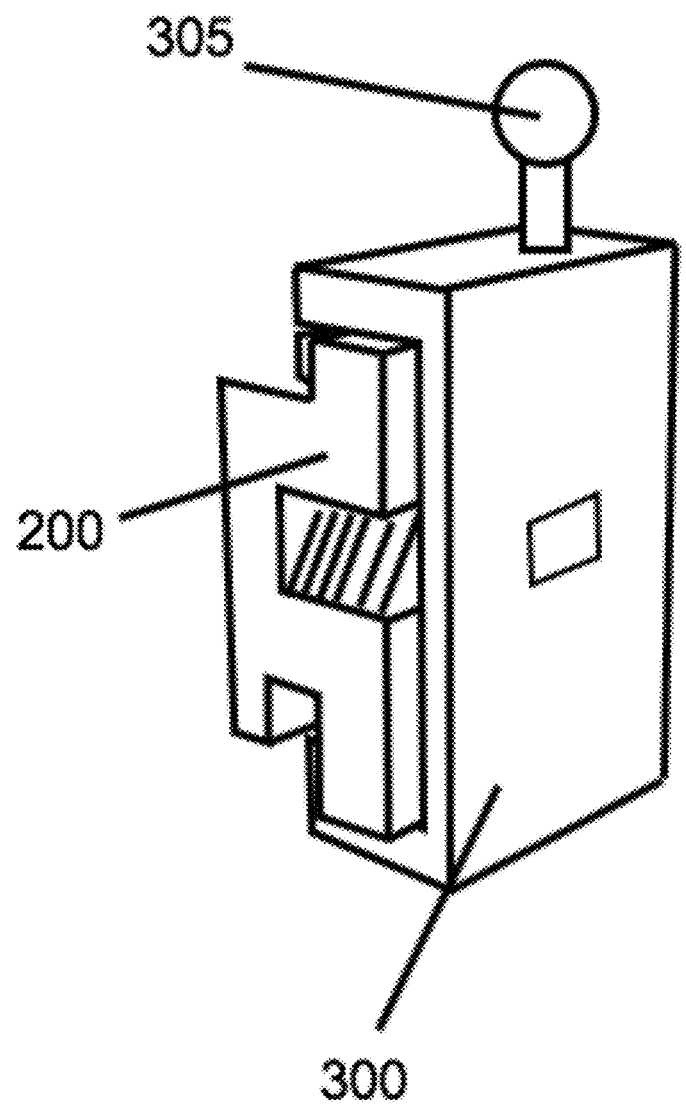
FIG. 15 is a perspective view of yet another embodiment of an orthodontic bracket assembly with a ball hook.
Figure 16:
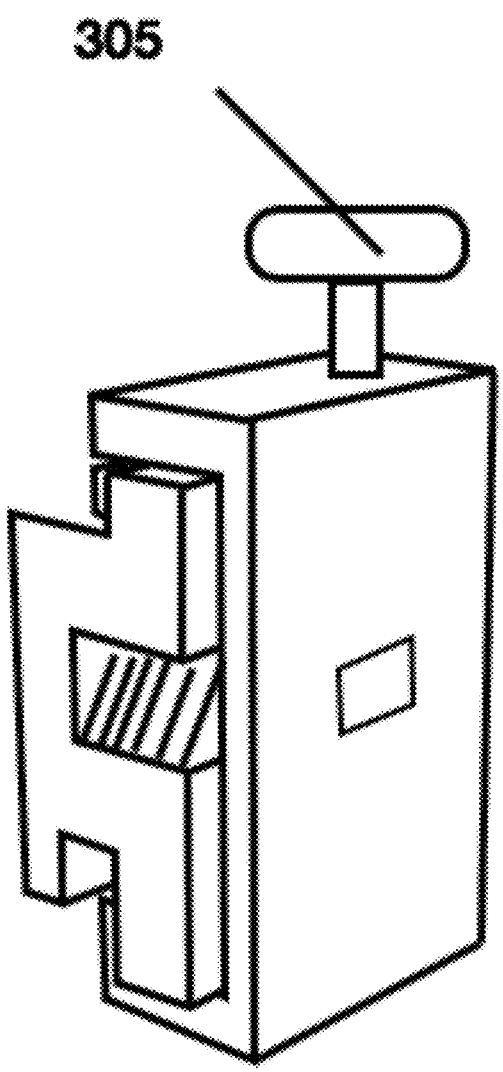
FIG. 16 is a perspective view of yet another embodiment of an orthodontic bracket assembly with a T-hook.
Figure 17:
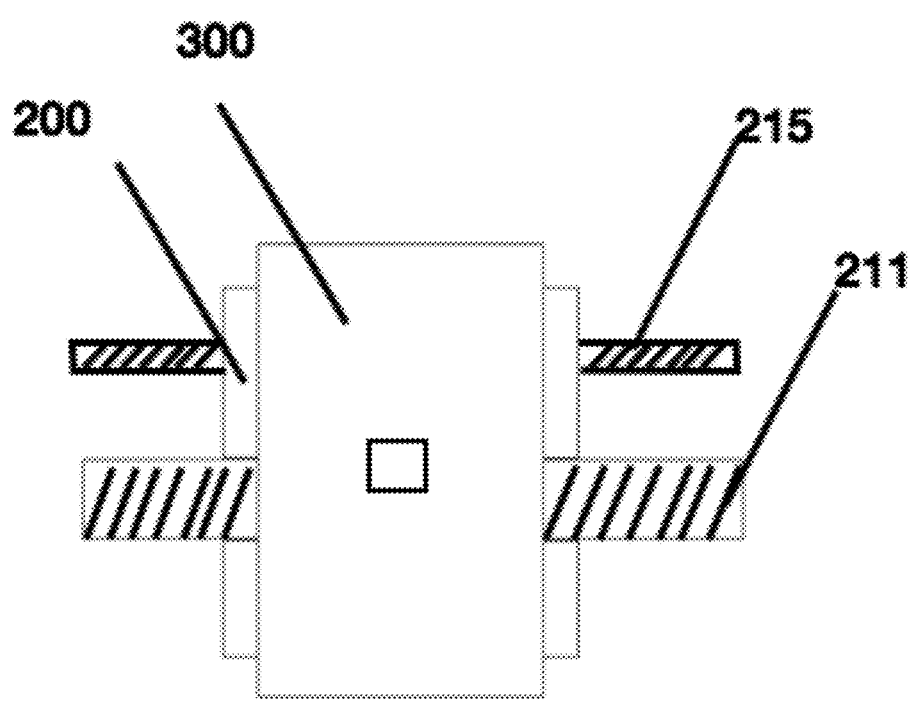
FIG. 17 is a front view of an orthodontic bracket assembly with a primary and secondary archwire.
Figure 18:
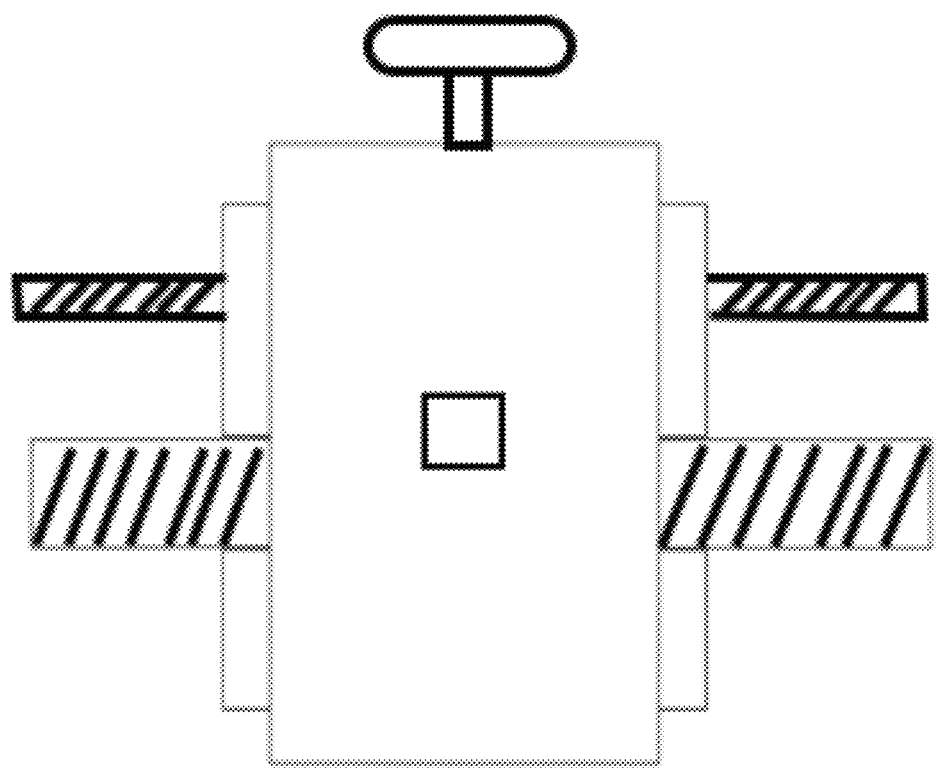
FIG. 18 is a front view of another embodiment of an orthodontic bracket assembly with a primary and secondary archwire and a T-hook.
Figure 19:
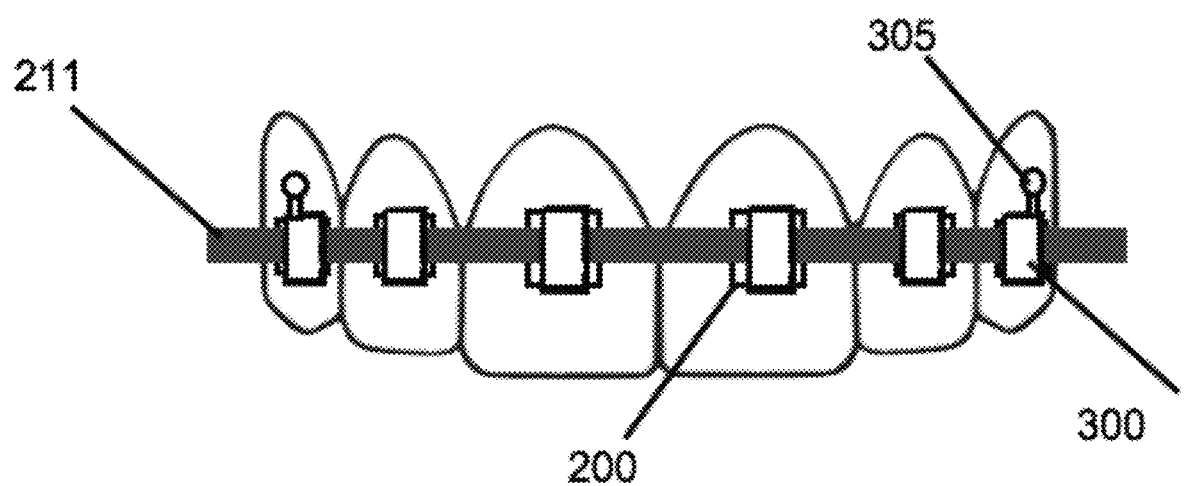
FIG. 19 is an illustration of a row of teeth with an orthodontic bracket assembly and an archwire.

In some embodiments, the customizable bracket cover 200 is frictionlessly secured onto a bracket base 300 as shown in FIG. 14. This allows a clinician to exert less force in the course of the orthodontic treatments.

However, in some embodiments, the customizable bracket cover can further include an inner surface projection 306 to exert pressure on the archwire 211. The inner surface projection can be of any shape, can be at one angle or slanted for a specific desired pressure on the archwire and for specific desirable treatment results.

Figure 1:
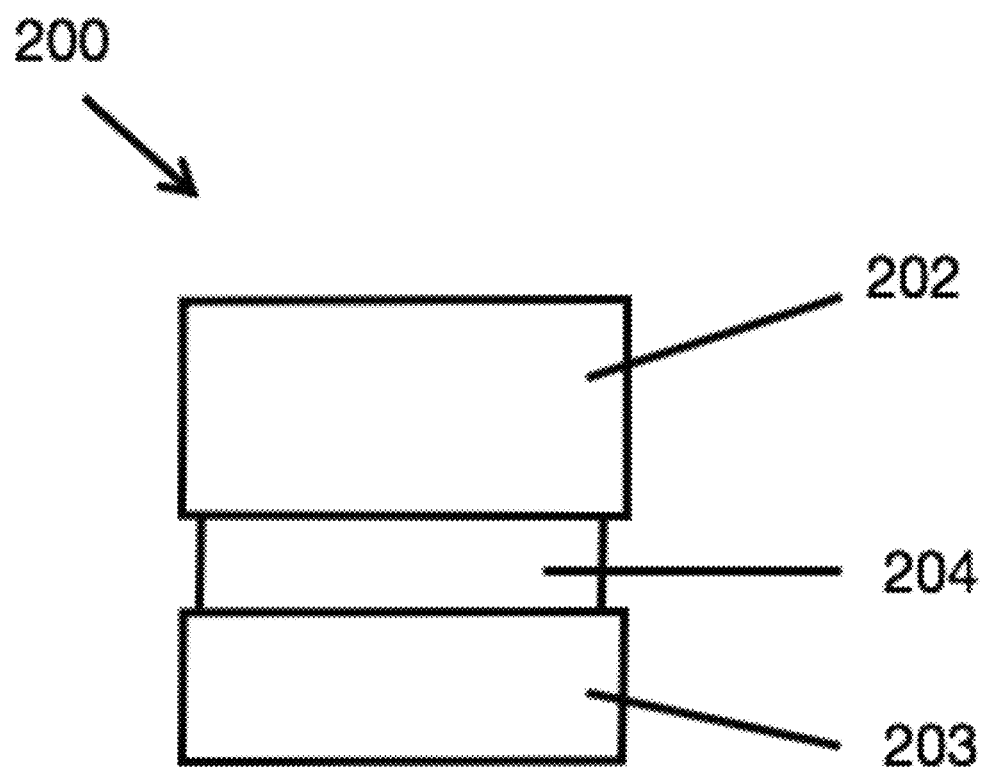
FIG. 1 is a front view of a bracket base.
Figure 2:
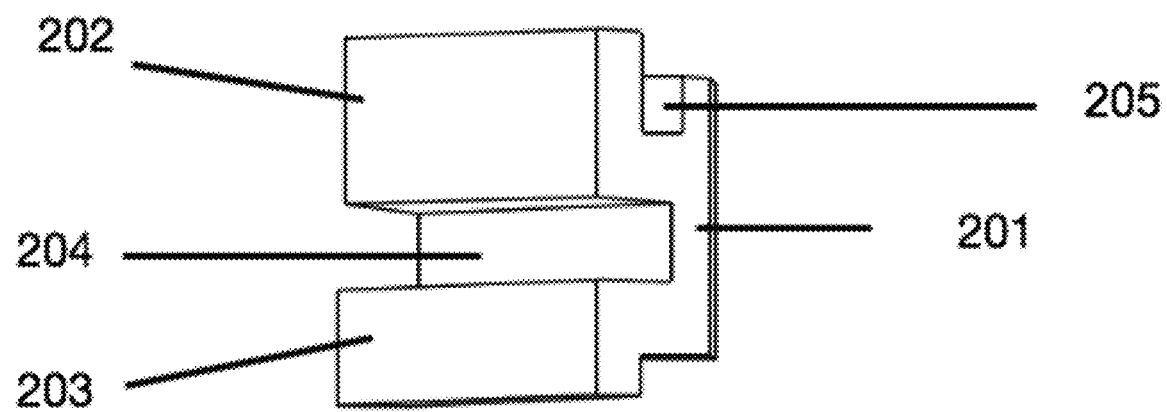
FIG. 2 is a perspective view of the bracket base shown in FIG. 1.
Figure 4:
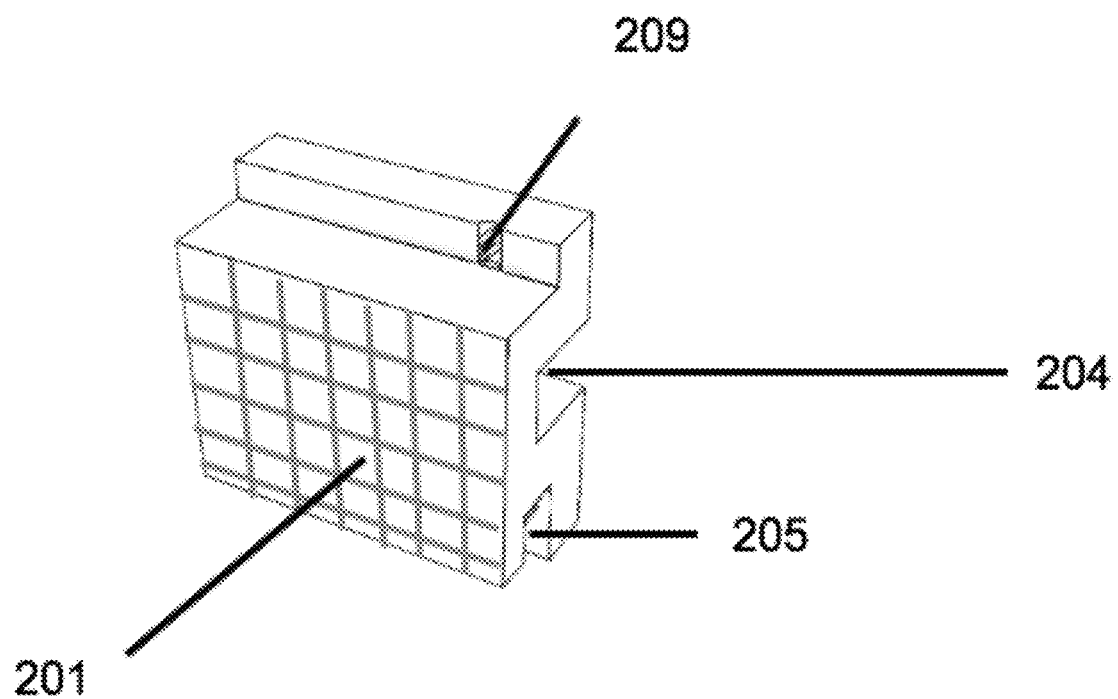
FIG. 4 is a top elevational view of another embodiment of a bracket base.
Figure 5:
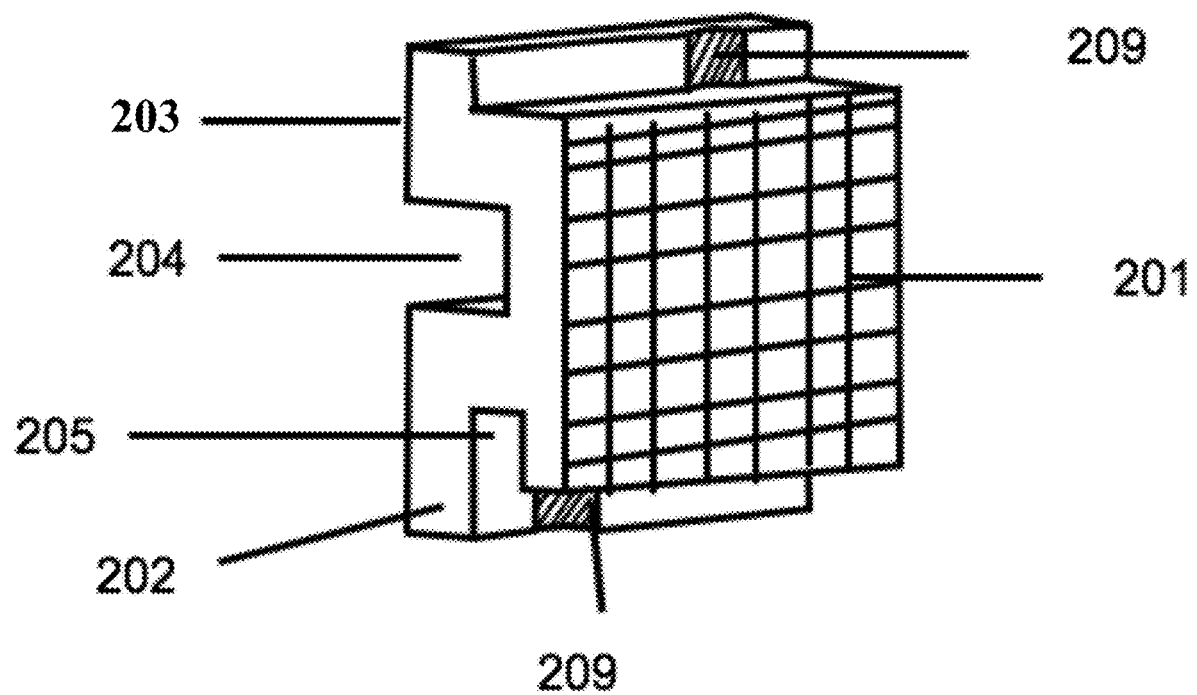
FIG. 5 is another view of the bracket base shown in FIG. 4.
Figure 13:
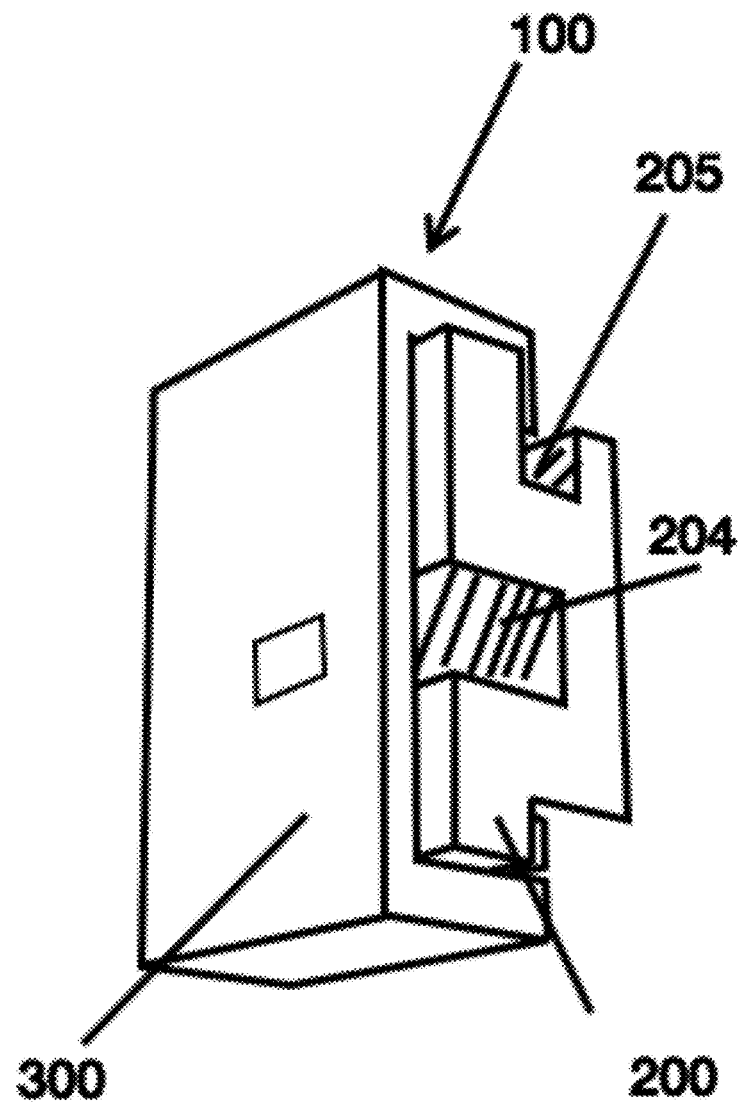
FIG. 13 is a bottom perspective view of the orthodontic bracket assembly shown in FIG. 12.
Figure 28:
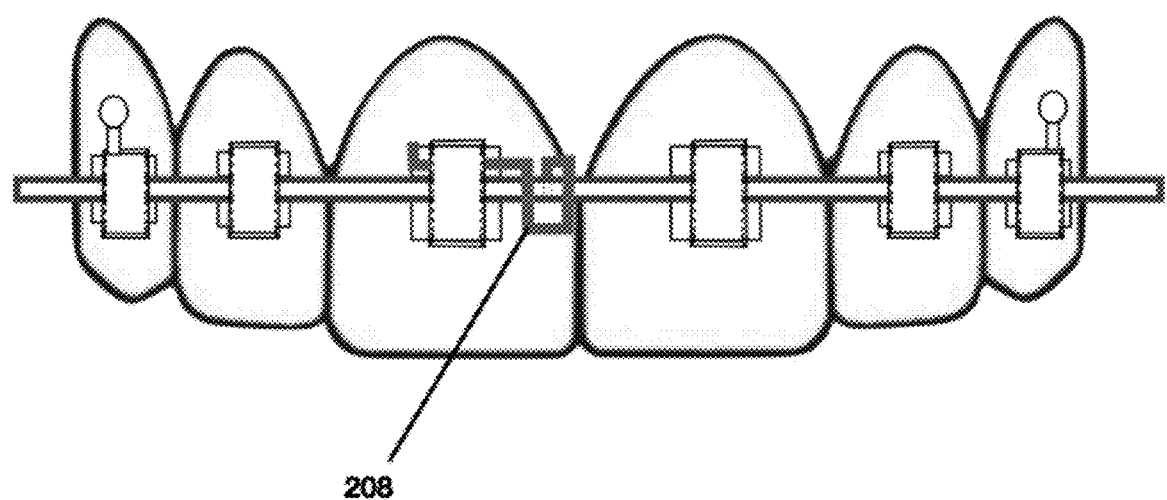
FIG. 28 is an illustration of a row of teeth with an orthodontic bracket assembly, an archwire, hooks and torquing springs.
Figure 29:
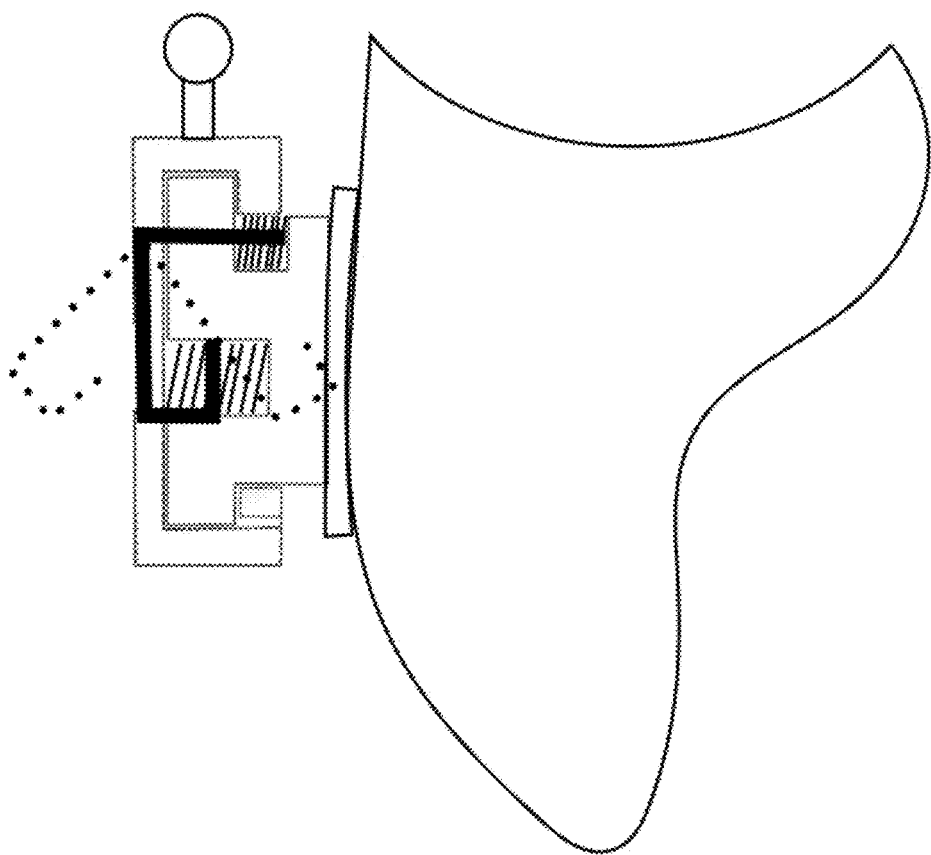
FIG. 29 illustrate an example of improved torque control using the orthodontic system of FIG. 28.

As shown in FIGS. 2, 4 and 5, the bracket base 200 can also include a secondary slot 205. This secondary slot 205 formed by an extension of the bracket cover mounting portion 201 and an upper or lower retention element 202 or 203 serves as an additional and secondary slot where a secondary archwire 215 can be inserted and secured for faster teeth movement. In some embodiments, the secondary slot 205 as shown in FIGS. 13 and 14, can receive a secondary archwire 215, a removable hook 207 as shown in FIG. 27, a torquing spring 208 as shown in FIG. 28 or a combination of archwire, hook and spring.

Figure 7:
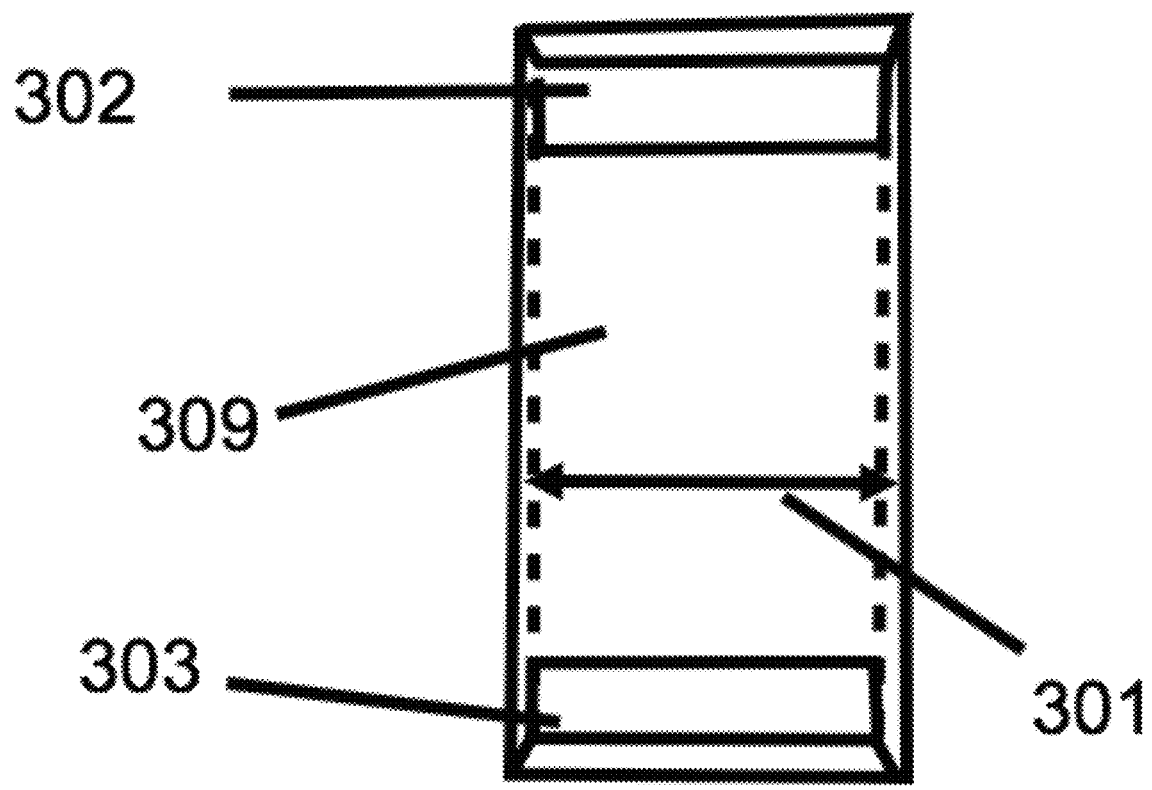
FIG. 7 is a rear view of the customizable bracket cover shown in FIG. 6.
Figure 8:
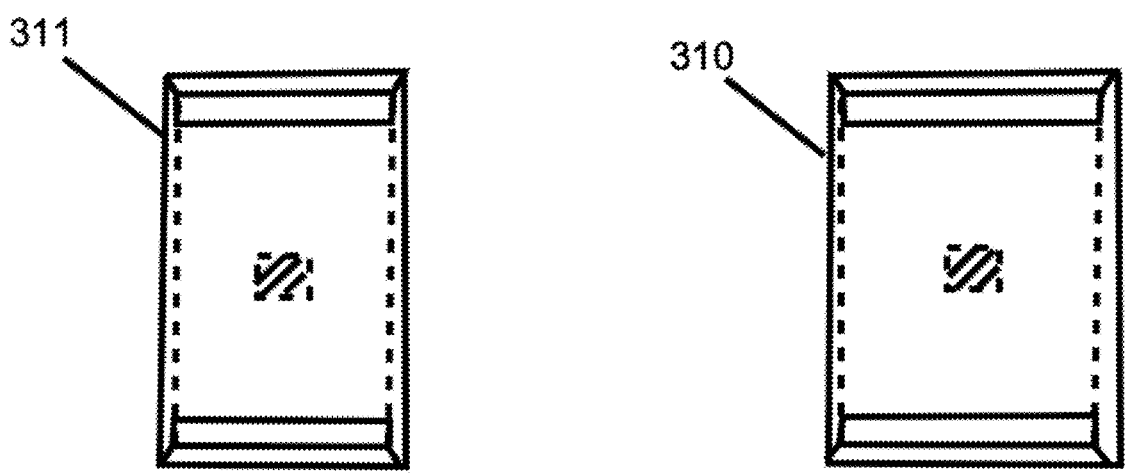
FIG. 8 is a rear view illustrating two different embodiments of a customizable bracket cover with different widths.

A few features make the bracket cover 300 truly customizable from one tooth to the next and throughout the course of an orthodontic treatments. In some embodiments, the customizable bracket cover 300 has a width 301 which can vary from one assembly to the next from one tooth to the next and throughout the course of a treatment. As shown in FIGS. 7 and 8 the width of a bracket cover 300 can be of a narrow width 310 or a wide width 311. The width of the cover controls an archwire stiffness for a customizable treatment.

Figure 9:
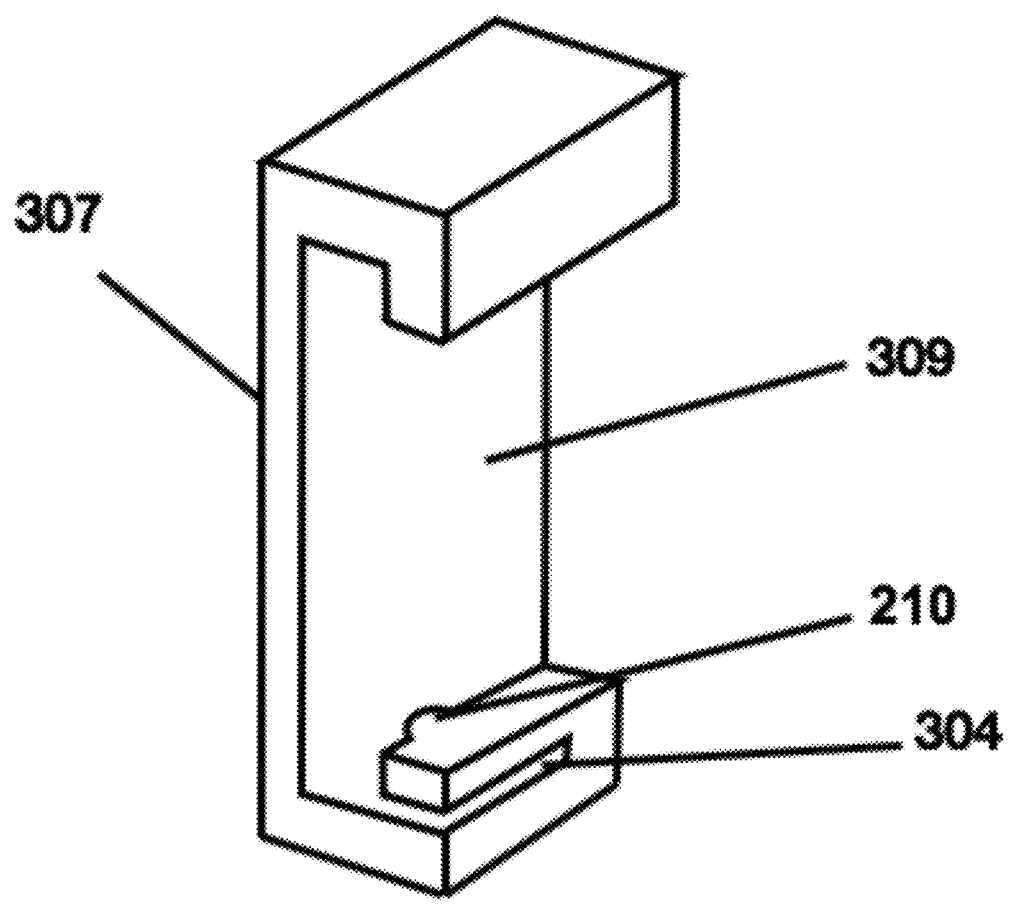
FIG. 9 is a top elevational view of a customizable bracket cover with a slit and projection for a locking mechanism.
Figure 10:
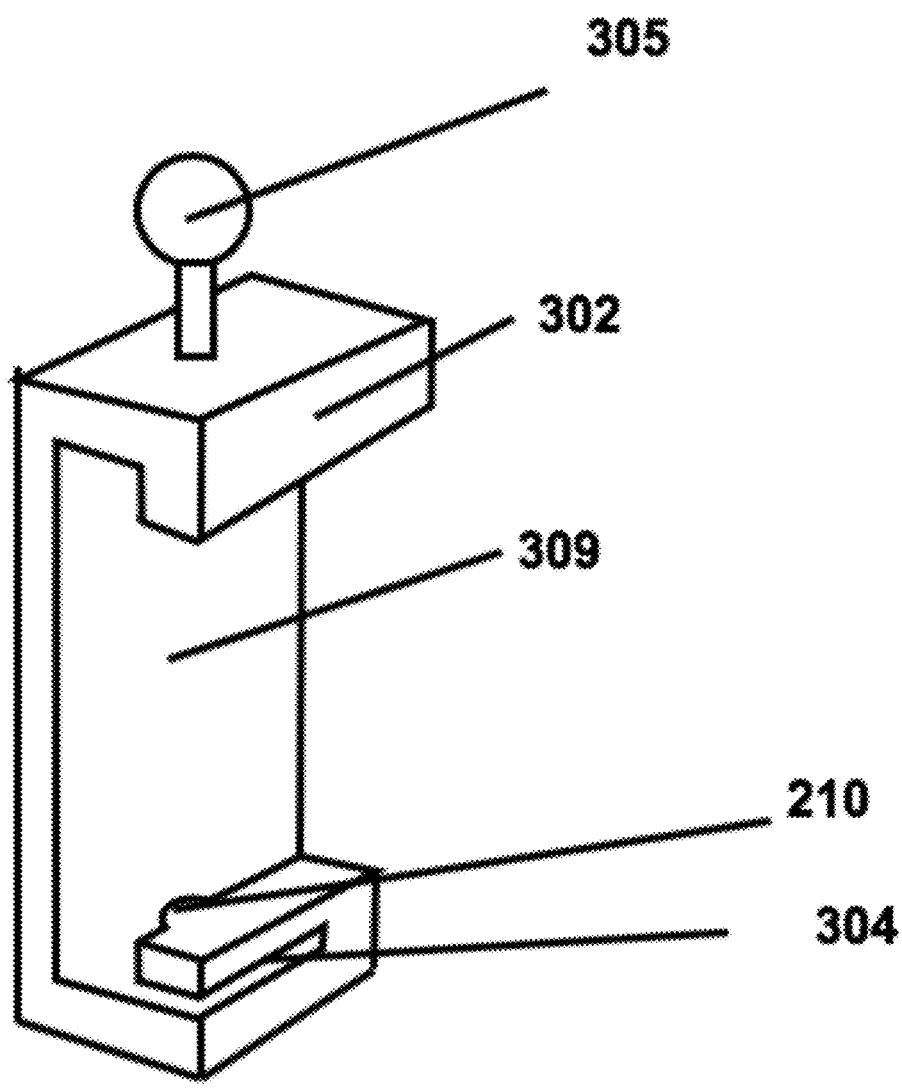
FIG. 10 is another top elevational view of a customizable bracket cover with a hook.
Figure 11:
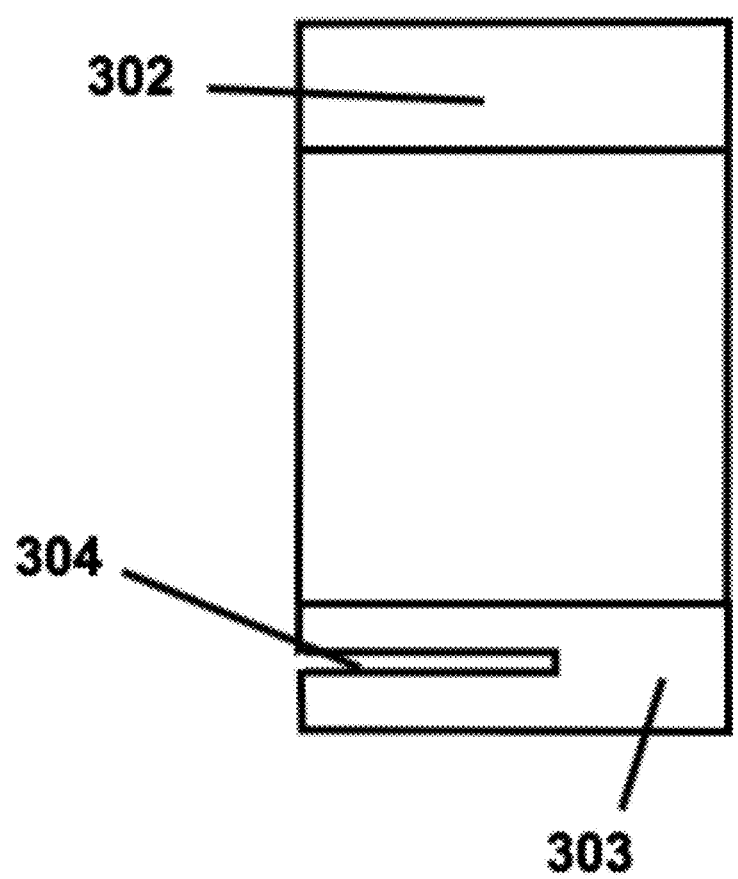
FIG. 11 is a rear view of a customizable bracket cover with a slit.

In some embodiments and as shown in FIGS. 9 through 11, the customizable bracket cover can include a slit or an opening to facilitate the coupling and decoupling, sliding and removal of the bracket base 200 on the customizable bracket cover 300.

Figure 20:
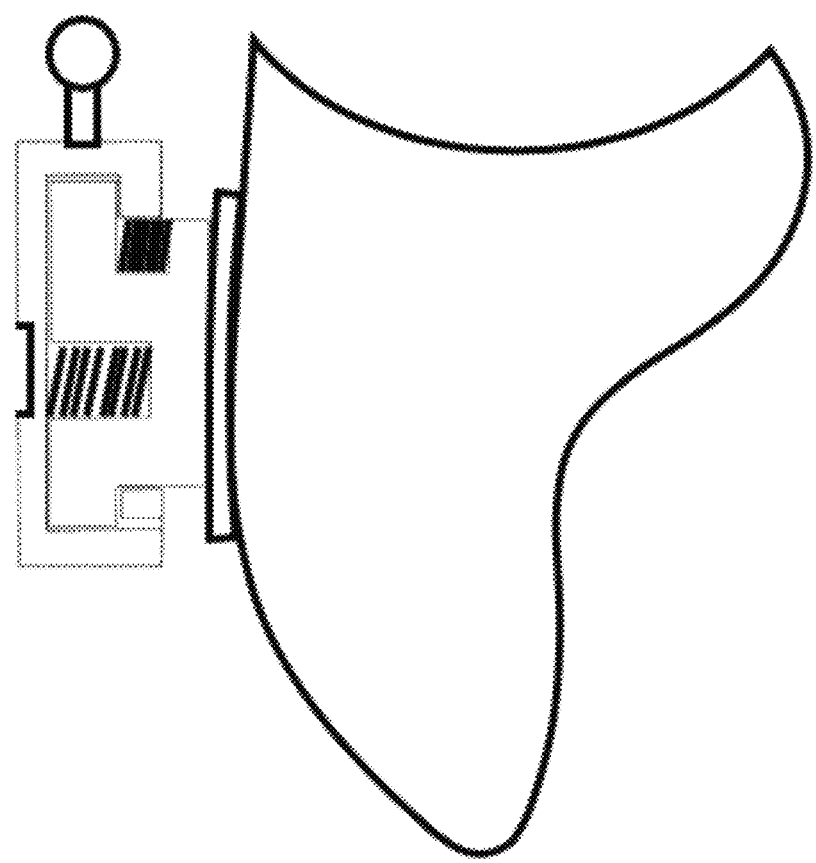
FIG. 20 is an illustration of a tooth with an orthodontic bracket assembly with a hook and archwire attached to the tooth.
Figure 21:
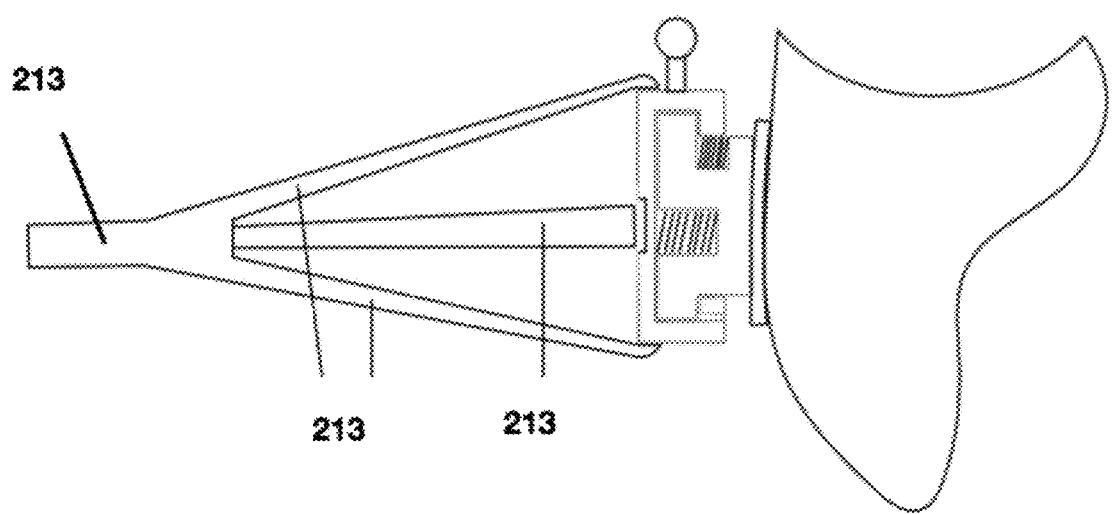
FIG. 21 is an illustration of a tooth with an orthodontic bracket assembly with a hook and archwire attached to the tooth and a tool used to couple and decouple bracket cover to bracket base.

FIGS. 14, 20 show an indentation on a face of the customizable cover 308. The indentation 308 is used to facilitate the sliding and removal of the bracket cover 300 onto a bracket base 200. In some embodiments, the assembly also includes a tool 213 as shown in FIG. 21 which is adapted to connect to the indentation and which facilitates the coupling and decoupling of the bracket base 200 to the customizable bracket cover 300.

Figure 3:
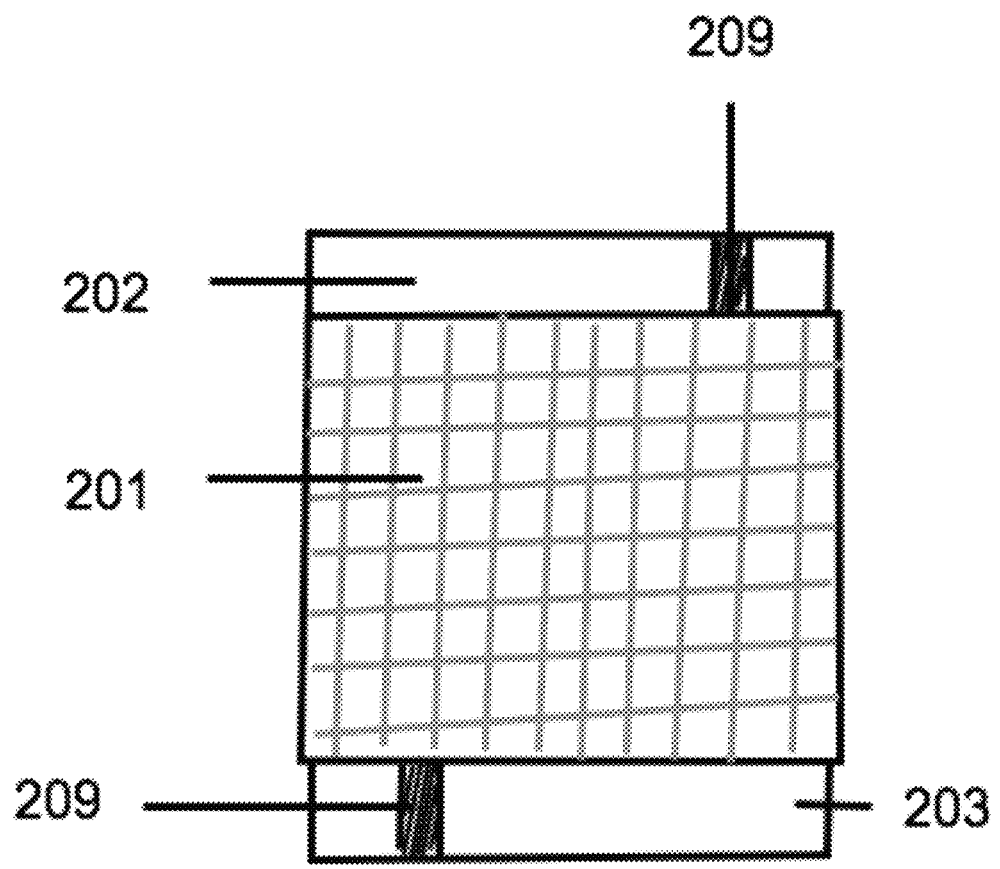
FIG. 3 is a rear view of the bracket base shown in FIG. 1.

In other embodiments, the orthodontic bracket assembly 100 includes two main components: a bracket base 200 and a customizable bracket cover 300. During orthodontic treatment, a clinician attaches the bracket base 200 to a patient's tooth as shown in FIG. 20 with an adhesive or other suitable bonding material. The bracket base 200 includes a mounting portion 201 or mounting face which is suitable for attachment to the patient's tooth. In some embodiments, the mounting portion 201 can be a rugged, smooth or meshed surface as shown in FIGS. 3 and 4 to make sure that the bracket base 200 adheres to the patient's tooth for the entire duration of a treatment without having the reattach the bracket base.

In some embodiments of the present disclosure, the bracket base 200 does not change throughout the duration of the treatment, and only the removable and customizable bracket cover 300 is changed throughout the treatment. In most embodiments, the bracket base 200 includes an upper retention element 202 and a lower retention element 203. These upper and lower retention elements serve a few purposes in the orthodontic treatment disclosed herein. The upper and lower retention elements 202 and 203 serve as arms or wings or retention elements for the customizable bracket cover to attach to. In addition, the upper and lower retention elements 202 and 203 form a slot 204 where an archwire 211 is positioned. The archwire 211 is secured onto the bracket base 200 thanks to the customizable bracket cover 300.

To simplify and optimize the orthodontic treatment of the present disclosure, only the customizable bracket cover 300 is changed throughout the treatment, and the bracket base which is attached to the patient's tooth remains the same.

Figure 22:
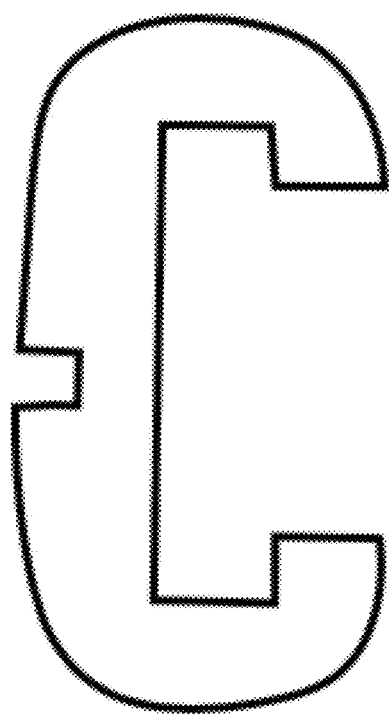
FIG. 22 is side view of another embodiment of a customizable bracket cover with round edges.
Figure 23:
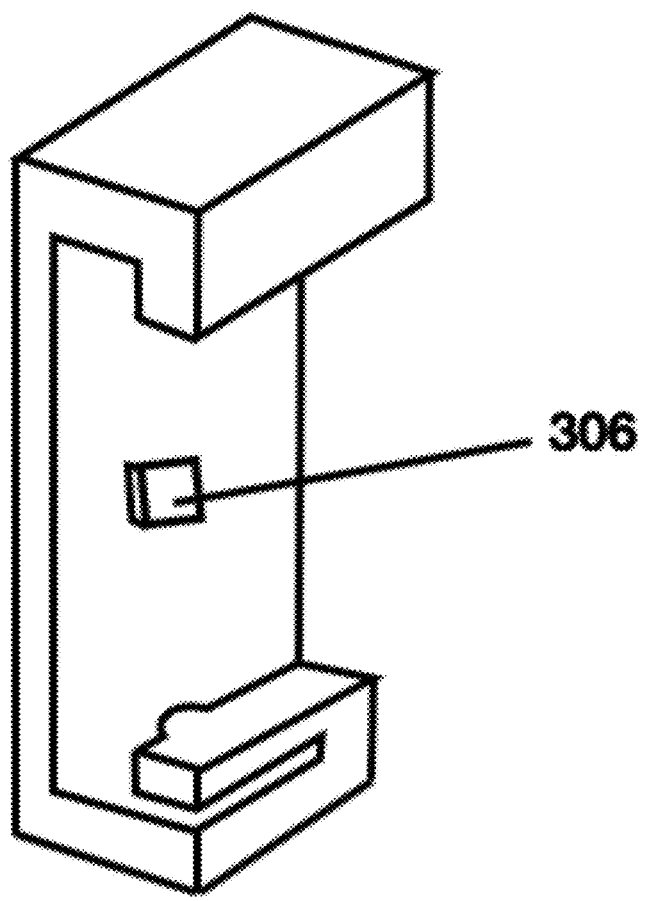
FIG. 23 is a rear perspective view of another embodiment of a customizable bracket cover with an inner surface projection for customized orthodontic treatment.
Figure 24:
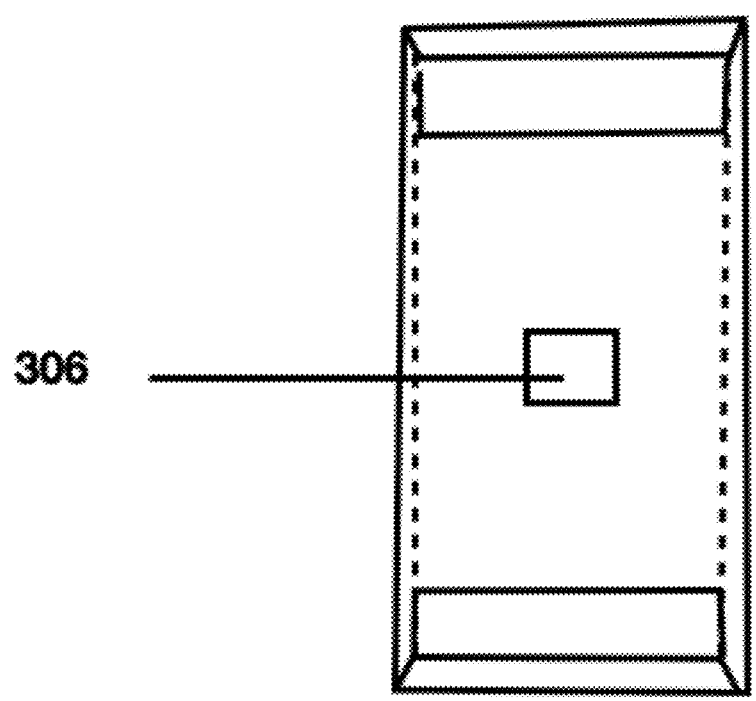
FIG. 24 is a rear view of the bracket cover shown in FIG. 23.
Figure 26:
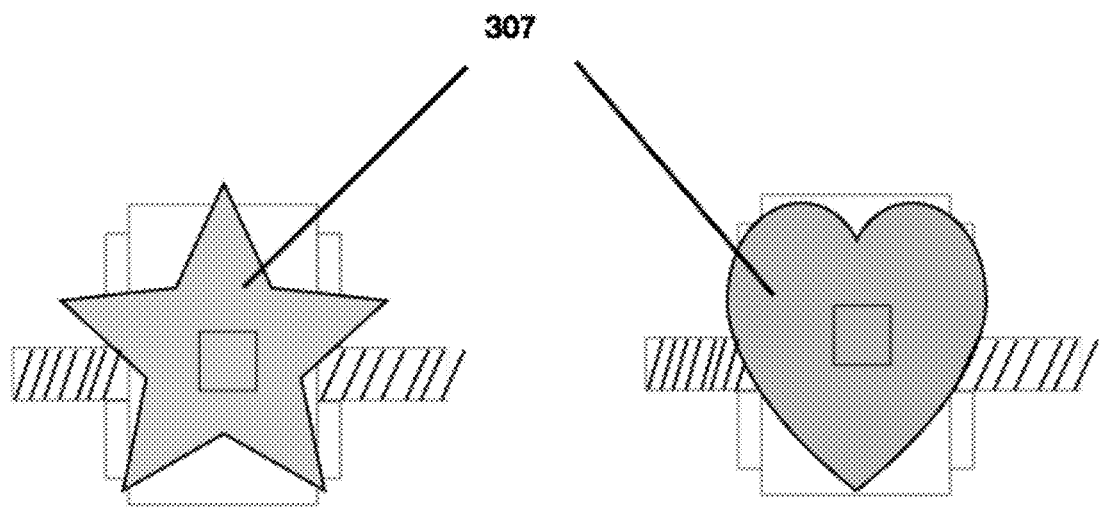
FIG. 26 is front view of another embodiment of a bracket cover with interchangeable faces.

In some embodiments, the customizable bracket cover 300 has customizable faces 307. These faces can vary in color, material and shape as shown in FIG. 26. In addition, the shape of the customizable bracket cover 300 can change. In some embodiments, the bracket cover has round corners as shown in FIG. 22. The rounder edges create less friction with the inside of patient's lips, thereby making the treatment more comfortable.

In other embodiments as shown in FIG. 8, the width of the bracket cover can be changed from one tooth to another and throughout different stages of an orthodontic treatment. The bracket cover can be narrow or wide or vary in width.

In yet another embodiment, the upper and lower lips 302 and 303 of the bracket cover 300 can vary in size and shape, so long as they are couplable to the bracket base 200.

Figure 6:
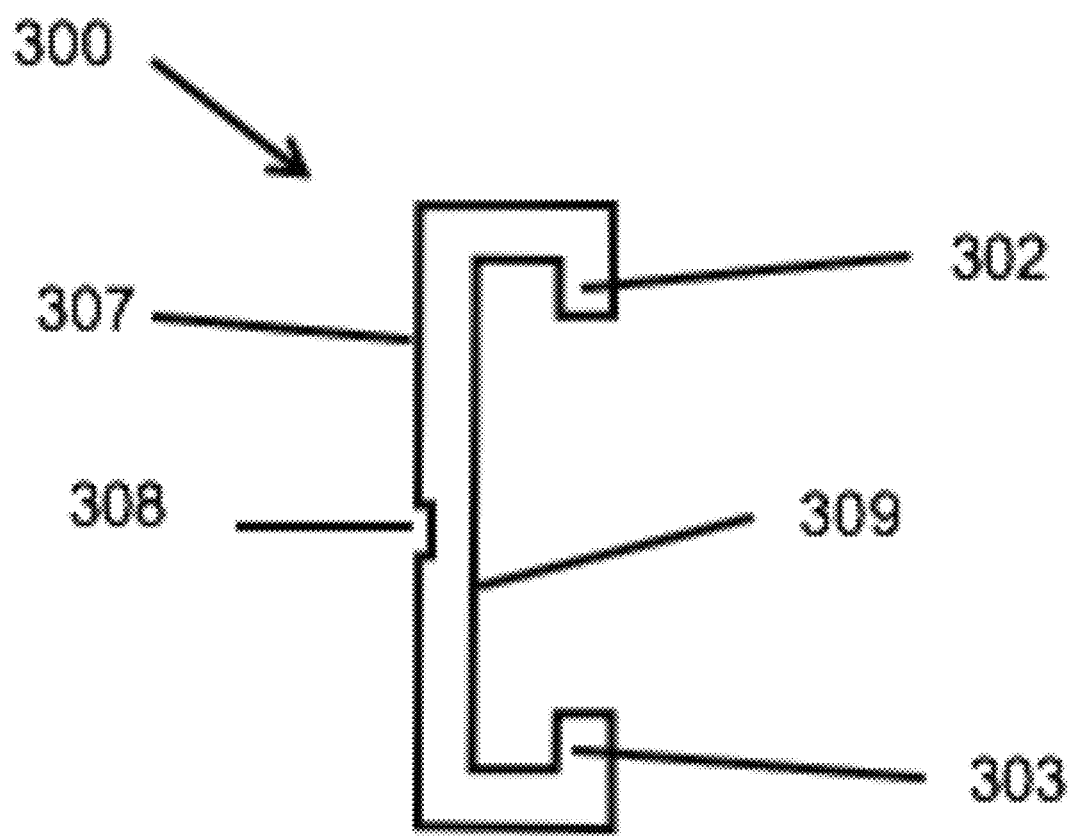
FIG. 6 is a side view of customizable bracket cover.

To further customize the orthodontic treatment, the inner surface wall 309 is adjustable. The wall can be at a 90 degree angle as shown in FIG. 6 or be at various angles and slanted for torquing and angular displacement of teeth in an orthodontic treatment (not depicted here). In some embodiments, the orthodontic bracket assembly and customizable bracket cover's inner surface wall angle controls torquing of a tooth treatment.

Figure 25:
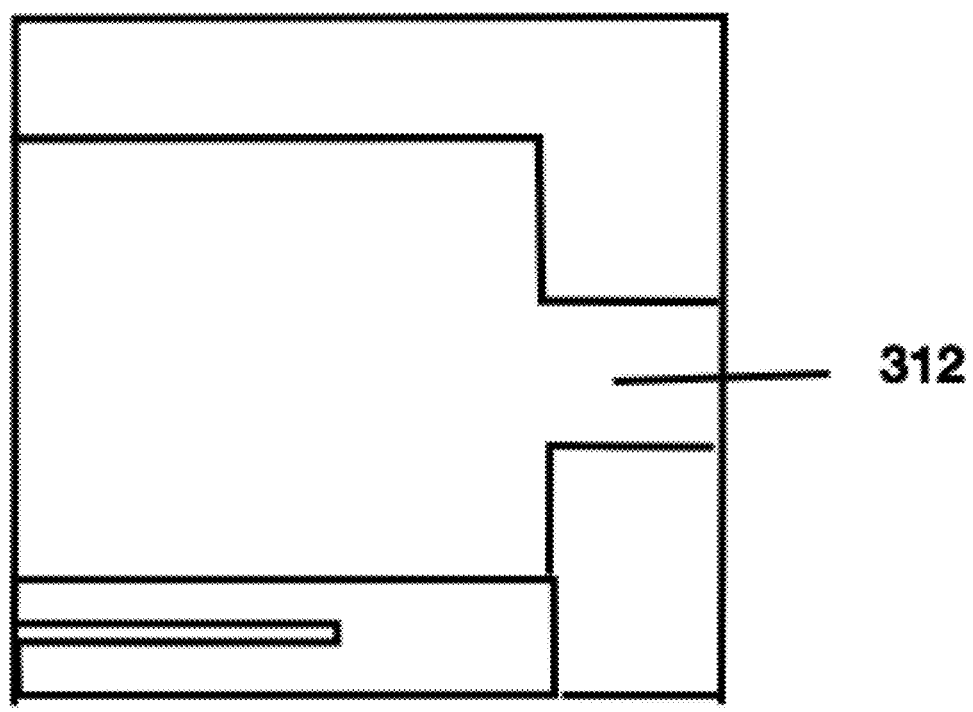
FIG. 25 is a rear view of another embodiment of a bracket cover with an adjustable extended slot.

In yet another embodiment, the customizable bracket cover 300 includes an adjustable extended slot adapted 312 as shown in FIG. 25 to control the stiffness and a torquing of the archwire and for controlling the tooth treatment.

In some embodiments, the customizable bracket cover's face 307, a width 301, a length of the extended archwire slot; and an angle of the inner surface wall 309 are changed throughout an orthodontic treatment to deliver a customized orthodontic treatment.

In other embodiments, the orthodontic treatment system includes a plurality of orthodontic bracket assemblies where the customizable bracket covers 300 are changed individually from tooth to tooth and over a period of time throughout a course of an orthodontic treatment.

The current disclosure is a versatile orthodontic bracket assembly designed to provide the practitioner with customized applications for an efficient orthodontic treatment. Such a bracket assembly is composed of two separate parts: a bracket base and a bracket cover.

In some embodiments, the bracket base 200 with an archwire slot 204 and a narrower upper horizontal auxiliary recessed slot 205. The bracket base includes two vertical projections, wings and/or retention elements extending upwards and downwards from the upper & lower edges of the bracket base.

In other embodiments, the bracket base 200 also includes one or more 2 notches (female parts) and/projections for coupling the bracket base 200 to a bracket cover 300. In a specific embodiment as depicted in FIG. 3. One on the left aspect of the dorsal (posterior) surface of the upper vertical extension and another on the right aspect of the dorsal surface of the lower vertical extension. In this embodiment, the mounting portion 201 is a mesh secured to the bracket base to allow for mechanical bonding to the tooth surface using a dental adhesive.

In yet another embodiment, the removable/detachable sliding locking customizable bracket cover or sleeve is C-shaped in cross section, ending with a horizontal & a vertical lip. In this embodiment, the bracket cover 300 is made to slide sideways over the bracket base 200 to maintain the archwire 211 in place as its vertical lips 302 and 303 engage the posterior surface of the retention members of the bracket base 200. Such positive engagement prevents facial (anterior/frontal) demounting of the sleeve, which also has a projection near the end of the inner surface of one its vertical lips (male part) that engages or locks into one of the bracket notches (female part) situated on the inner surface of the upper or lower wings, depending on the direction of insertion of the sleeve. This positive engagement prevents lateral demounting of the locking sleeve. This engaging mechanism can be magnetic in case of a metal bracket base and a metal locking sleeve combination.

In other embodiments, the customizable bracket cover also features a horizontal slit 304 on the same vertical lip that bears the projection to provide it with flexibility to slide over the bracket until it engages the bracket base notch.

In some embodiments, the locking mechanism is attained by sliding the bracket cover onto a bracket base. In this embodiment, the archwire 211 is not bound to the orthodontic bracket assembly 100 as in the case of steel and elastic ligatures, thus reducing frictional forces that are undesirable during tooth movement.

However, in other embodiments, the customizable bracket cover can further include an inner projection 306 on the bracket cover's inner surface that comes in juxtaposition with the main archwire when the ligating bracket cover is locked. This inner projection 306 exerts pressure on the anterior surface of the archwire, thus the bracket becomes actively ligated, when required.

In some embodiments, a small rectangular or square depressed area 308 is found in the middle of the facial surface of the bracket cover and on the outside of the bracket cover 300. A separate instrument or wrench resembling bracket tweezers 213 can be used to facilitate insertion and removal of the bracket covers from the proximal aspect (sideways), if desired. The middle member of the wrench fits into the square or rectangular depression on the facial surface of the locking sleeve while the upper and lower members grip the edges of the locking sleeve as shown in FIG. 21.

In some embodiments, the disclosed orthodontic bracket assembly 100 is made to meet the needs of the orthodontic profession and improve the quality of the resulting orthodontic treatment in view of the following updated and customizable features. The sliding bracket covers that are used can be made narrow, standard or wide so they can be used as deemed necessary during the various stages of treatment e.g. a narrow sleeve is used during leveling & aligning to increase arch wire flexibility and reduce force levels for a faster physiologic tooth movement. Then, the bracket covers 300 can be changed with a wider bracket cover for better rotational and tip control during the later stages of treatment as required during canine retraction, space closure & finishing. In fact, customizable bracket covers 300 of different widths 301 can be variably selected for different teeth to plan individualized tooth movements or prevent unwanted side effects (versatile action).

The bracket assembly of the present disclosure obviates the need for steel or elastomeric ligatures; hence no frictional forces to overcome during tooth movement, so reducing the undesired loss of anchorage, whereby the teeth used as anchors resist the forces necessary for retraction of protruded teeth.

The bracket assembly of the present disclosure is also easier to clean than the conventional bracket of the prior art that uses steel or elastic ligatures for ligation of the archwire as other bracket assemblies can include intricate passageways for their sliding covers which get filled with plaque and calculus during the course of treatment.

In some embodiments, the customizable bracket cover can be made in bright colors or can be tooth colored to hide the metallic braces for improved esthetics in order to fit every patient demands and needs. The use of interchangeable customizable bracket covers eliminates the need to replace the whole bracket, and only the bracket cover is changed throughout the course of the treatment.

In some embodiments, hooks 207 (Ball or T-shaped) can be added to the upper surface of a bracket cover; centrally or peripherally so that they are used only when needed unlike integral bracket hooks that remain during the whole length of treatment. Such hooks can be both irritating to the patient lips & cheeks and unhygienic as they can trap food debris behind them. This helps to reduce the risk of cervical enamel demineralization or white spot lesions.

In other embodiments, the hooks and brackets covers and/or bracket bases are inverted when bonded on the teeth to attain a reverse angulation of the bracket slot relative to tooth to effect the desired inclination, as seen required by the clinician without having the integral hook impede the patient's bite, which sometimes necessitates its removal by the clinician.

In some embodiments, the orthodontic bracket assembly is made of stainless steel, ceramic, plastic, titanium or a combination thereof. In other embodiments, the bracket base and bracket cover are made of the same materials, while in other embodiments, the bracket cover and bracket base are made of different materials. In yet another embodiment, the bracket cover can be made of the same material or nitinol as the bracket base to allow for easy placement & removal (flexibility).

In yet another embodiment, a recessed area in the bracket base becomes a secondary slot 205 as shown in FIG. 2 when the bracket cover 300 is attached to the bracket base 200. This slot can receive a secondary archwire which could be employed to provide additional corrective forces to the tooth, if necessary. It can also receive a torquing auxiliary such as a spring 208 or a hook 207 or 305.

In other embodiments a design cover in the shape of a heart, diamond, flower or else can be affixed to the facial surface of the bracket cover in order to motivate younger patients or adults and make their orthodontic treatment more enjoyable.

Other embodiments and configurations may be devised without departing from the spirit of the invention and the scope of the appended claims.

What is claimed:

1. An orthodontic bracket assembly treatment system comprising:
   (1) a bracket base having:
   (a) a mounting portion defining a mounting surface structurally configured to be attached to a labial surface of a patient's tooth;
   (b) an upper retention element extending from an upper end and spaced apart from the mounting surface;
   (c) a lower retention element extending from a lower end and spaced apart from the mounting surface, with the lower retention element being opposite the upper retention element wherein said upper retention element and said lower retention element form a slot adapted to receive an archwire therealong; and (2) a plurality of rigid selectable bracket covers slidably engageable with the bracket base from either a left axial direction or a right axial direction, each rigid selectable bracket cover having:
 (a) a width, wherein said width is selectable to control a stiffness of the archwire;
 (b) an upper lip formed at an upper end of a face of each selectable bracket cover; and
 (c) a lower lip formed at a lower end of the face opposite of the upper end to collectively define a channel, wherein each of the selectable rigid bracket covers is removably slidably couplable to said bracket base by slidably engaging the upper lip with the upper retention element and the lower lip with the lower retention element, and wherein the width of the face of a first one of the rigid selectable bracket covers is wider than the width of the face of a second one of the rigid bracket covers and each of the selectable rigid bracket covers can be selectively releasably attached to the bracket base during a treatment such that the treatment utilizes one of the first bracket cover and the second bracket cover depending on a patient's treatment needs at a stage of the treatment; wherein the face of the plurality of rigid selectable bracket covers further comprises an indentation adapted to facilitate a removal of the at least two rigid selectable bracket covers; and (3) a removal tool comprising upper and lower members configured to grip the upper and lower lips of the bracket cover and a middle member configured to engage the indentation to facilitate removal of the bracket cover in a direction substantially perpendicular to the labial surface of the patient's tooth.

2. The orthodontic bracket assembly treatment system of claim 1 wherein the plurality of rigid selectable bracket covers include at least one of a narrow bracket cover, a standard bracket cover and a wide bracket cover adapted to be selected during a stage of the treatment for a treatment needs.

3. The orthodontic bracket assembly treatment system of claim 2 wherein the width of the face of the narrow bracket cover is narrower than the bracket base mounting surface width; wherein the width of the face of the standard bracket cover is substantially similar the bracket base mounting surface width and wherein the width of the face of the wide bracket cover is wider than the bracket base mounting surface width.

4. The orthodontic bracket assembly treatment system of claim 2 wherein the narrow bracket cover of the selectable bracket covers is selected during a leveling phase and an aligning phase of the treatment thereby increasing a flexibility of the archwire and reducing a force level for a faster physiologic tooth movement.

5. The orthodontic bracket assembly treatment system of claim 2 wherein the wide bracket cover of the selectable bracket covers is selected during a later stage of the treatment thereby controlling a canine retraction, a space closure and a finishing of the treatment.

6. The orthodontic bracket assembly treatment system of claim 1 wherein the bracket base and said plurality of two rigid selectable bracket covers form a horizontally extending secondary slot adapted to receive an auxiliary archwire further adapted to customize the treatment depending on the patient's treatment needs at the stage of the treatment.

7. The orthodontic bracket assembly treatment system of claim 1 further comprising a locking mechanism adapted to restrict axial movement of said plurality of two rigid selectable bracket covers in said bracket base, in an axial direction parallel to said slot adapted to receive said archwire.

8. The orthodontic bracket assembly treatment system of claim 7 wherein the locking mechanism comprises at least one set of complementary semi-circular notches and projections on the bracket base and the plurality of two rigid selectable bracket covers to restrict movement of the plurality of two rigid selectable bracket covers on the bracket base.

9. The orthodontic bracket assembly treatment system of claim 1 wherein the at least two rigid selectable bracket covers upper and lower lips slides or snaps and locks into the bracket base upper and lower retention elements thereby fritctionlessly securing the archwire onto the bracket base.

10. The orthodontic bracket assembly treatment system of claim 1 wherein the bracket base and the plurality of two rigid selectable bracket covers are coupled mechanically or magnetically and wherein two notches are disposed on the bracket base distanced from one another such that the plurality of two rigid selectable bracket covers can be slidably attached onto the bracket base from either a left axial direction or a right axial direction.

11. An orthodontic treatment method using an orthodontic bracket assembly system comprising:
 (a) attaching a plurality of bracket bases having a mounting portion to a corresponding number of a patient's teeth;
 (b) inserting a primary archwire along a primary archwire slot of the plurality of bracket bases;
 (c) selecting a bracket cover for each of the plurality of bracket bases from a set of selectable bracket covers, the set including at least one of a narrow bracket and one of a wide bracket cover for each of the plurality of bracket bases according to at least one of an orthodontic treatment phase and an orthodontic treatment need, wherein a face of each of the bracket covers in the set of bracket covers further comprises an indentation adapted to facilitate a removal of the selected bracket covers;
 (d) slidably coupling the selected bracket cover onto the bracket base of each of the plurality of bracket bases from either a left axial direction or a right axial direction thereby securing the primary archwire; and
 e) connecting an upper and lower members of a removal tool to an upper and lower lip of the selected bracket cover and further connecting a middle member of the removal tool to the indentation of the selected bracket cover and sliding the selected bracket cover in a direction substantially perpendicular to the labial surface of the patient's tooth to remove the selected bracket cover.

12. The orthodontic treatment method of claim 11 further comprising inserting a secondary archwire along a secondary archwire slot of the plurality of bracket bases and coupling the selected bracket cover onto the bracket base thereby securing the primary archwire and the secondary archwire on the patient's teeth.

13. The orthodontic treatment method of claim 11 further comprising:
 (a) individualizing the orthodontic treatment by selecting the bracket cover from the set of selectable bracket covers of at least one of a narrow width and one of a wide width throughout a treatment course depending on the patient's treatment needs;

(b) interchanging the bracket cover from the set of selectable bracket covers throughout the treatment course;
(c) selecting the narrow width bracket cover of the selectable bracket covers during a leveling phase and an aligning phase of the treatment thereby increasing a flexibility of the archwire and reducing a force level for a faster physiologic tooth movement; and
(d) selecting the wider width bracket cover of the selectable bracket covers during a later stage of the treatment thereby controlling a canine retraction, a space closure and a finishing of the treatment.

14. The orthodontic treatment method of claim 11 further comprising snapping and locking the selected bracket cover onto the bracket base thereby fritctionlessly securing the archwire onto the bracket base.

15. The orthodontic treatment method of claim 11 further comprising aligning and locking a complementary coupling set between the selected bracket cover and the bracket base thereby fritctionlessly securing the archwire onto the bracket base.

* * * * *